United States Patent
Karacali-Akyamac (10) Patent No.: US 8,619,588 B2
(45) Date of Patent: Dec. 31, 2013

(54) SYSTEM AND METHOD FOR PREDICTING VIDEO TRANSMISSION QUALITY THROUGH A NETWORK

(75) Inventor: Bengi Karacali-Akyamac, Bridgewater, NJ (US)

(73) Assignee: Avaya Inc., Basking Ridge, NJ (US)

( * ) Notice: Subject to any disclaimer, the term of this patent is extended or adjusted under 35 U.S.C. 154(b) by 365 days.

(21) Appl. No.: 12/861,429

(22) Filed: Aug. 23, 2010

(65) Prior Publication Data

US 2011/0249574 A1    Oct. 13, 2011

Related U.S. Application Data (60) Provisional application No. 61/321,663, filed on Apr. 7, 2010.

(51) Int. Cl.
*H04L 12/26* (2006.01)

(52) U.S. Cl.
USPC .......................................................... 370/241

(58) Field of Classification Search
USPC .......... 370/241, 248, 252; 348/180, 181, 192, 348/193; 709/204, 223, 227–229
See application file for complete search history.

(56) References Cited

U.S. PATENT DOCUMENTS

| | | | | |
|---|---|---|---|---|
| 5,107,450 A | * | 4/1992 | Lawrenz | 709/224 |
| 6,141,042 A | * | 10/2000 | Martinelli et al. | 348/181 |
| 7,023,471 B2 | * | 4/2006 | Balasubrawmanian et al. | 348/182 |
| 7,936,916 B2 | * | 5/2011 | Zhang et al. | 382/156 |
| 8,031,770 B2 | * | 10/2011 | Lee et al. | 375/240.08 |
| 8,189,052 B1 | * | 5/2012 | Lynch et al. | 348/180 |
| 2011/0069177 A1 | * | 3/2011 | Karacali-Akyamac | 348/180 |
| 2011/0149087 A1 | * | 6/2011 | Jeong et al. | 348/207.1 |

OTHER PUBLICATIONS

Tao, et al., "Real-Time Monitoring of Video Quality in IP Networks", NOSSDAV'05, Jun. 13-14, 2005, Stevenson, Washington, USA.
Cisco, "Delivering Video Quality in Your IPTV Deployment", 1992-2008 Cisco Systems, Inc. pp. 1-9, C11-380207-00 Jul. 2008.
Unify your network, "IP Videoconferencing Quality Issues Phase II", Network Readiness Assessment, Revision 0.02, Mar. 3, 2008, 33 pages.
Reibman et al., "Network Monitoring for Video Quality over IP". Dec. 2007.
"Video Quality System". Retrieved from www.triabs.ca on Jun. 16, 2009, 1 page.
Cheetah Technologies, "Cheetah V-Factor Stream Probe", Retrieved from www.cheetahtech.com Jun. 23, 2011. pp. 1-4.
NetQos, a CA Technologies Company, pp. 1-2, retrieved from http://www.ca.com/content/Integration/netqos.aspx Jan. 29, 2011.
Telchemy, VQmon, retrieved from www.telchemy.com Dec. 28, 2009, 1 page.
Tektronix, "MPEG Analyzer", retrieved from www.tek.com Jun. 23, 2011, 1 page.

* cited by examiner

*Primary Examiner* — Dmitry H Levitan (57) ABSTRACT

Disclosed herein are systems, methods, and non-transitory computer-readable storage media for approximating video transmission quality capability through a communications network. Initially, a processor is used to insert data into the network through a first endpoint that is delivered to a second endpoint. Then, at least one characteristic of the network between the first and second endpoints is determined based on how the second endpoint receives the data. After the at least one characteristic is determined, a representative video segment is selected based on the at least one characteristic. Finally, the representative video segment is output to demonstrate the video transmission quality capabilities of the network.

20 Claims, 5 Drawing Sheets

SYSTEM AND METHOD FOR PREDICTING VIDEO TRANSMISSION QUALITY THROUGH A NETWORK

PRIORITY CLAIM

This application claims priority to provisional application 61/321,663, filed 7 Apr. 2010, the contents of which are incorporated herein in their entirety.

BACKGROUND

1. Technical Field

The present disclosure relates to telecommunications and more specifically to predicting a representative quality of video transmission through a network.

2. Introduction

Presently there are multiple methods of determining the audio quality that a network is capable of handling. This is typically so because most audio streams have a set determination of quality that is easily measured. However, due to the diverse nature of different types of video streams, existing metrics and systems are unable to properly associate network capabilities with video quality. Presently, several different proxies are used in lieu of an actual estimate of video quality. Specifically, available bandwidth is one metric, but bandwidth is a poor substitute for video quality and raw bandwidth numbers do not adequately predict what video quality can be streamed through the network. Further, some statistics are collected regarding performance of the network and those statistics are presented as a proxy for video quality capabilities.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosure will first discuss the various components of an exemplary computing system, followed by a discussion of the various components of an exemplary communications network. The disclosure then turns to a more detailed discussion of predicting, estimating, or benchmarking video transmission quality in a network. Finally, the disclosure describes the example method embodiment of FIG. 5. The disclosure now turns to the exemplary computing system of FIG. 1.

Figure 1:
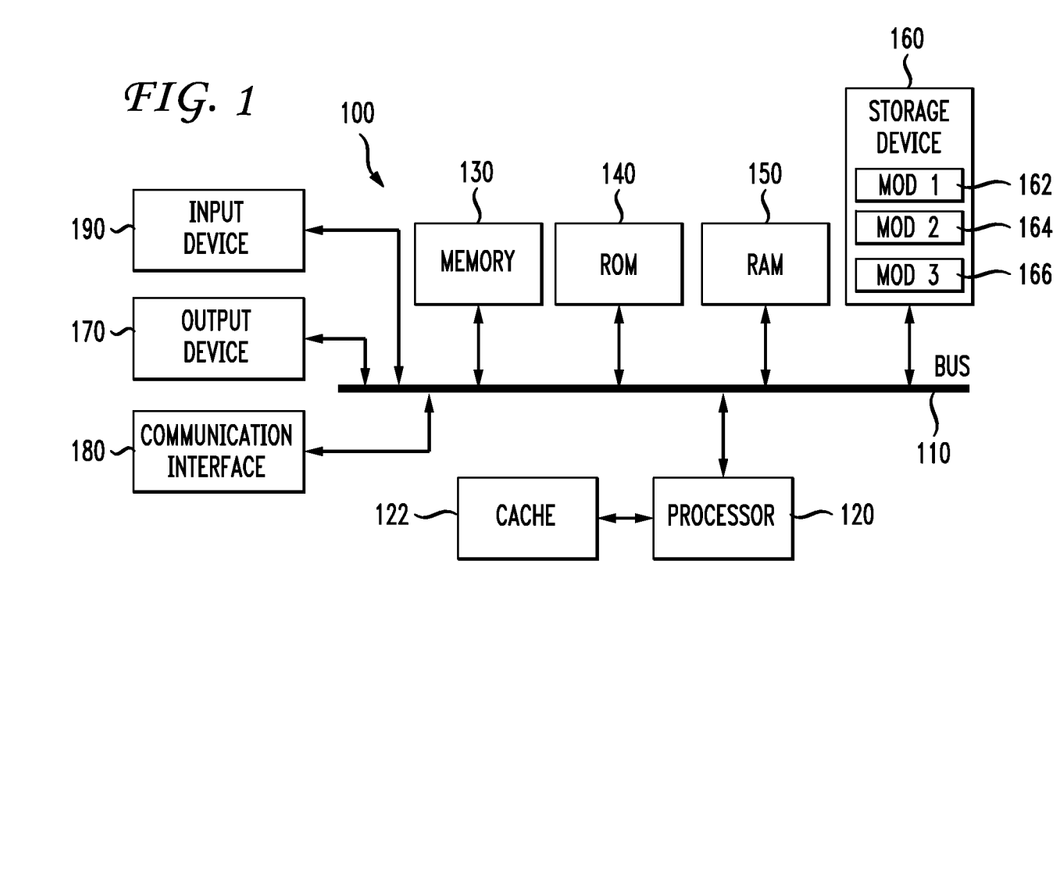
FIG. 1 illustrates an example system embodiment.

An exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache 122 provides a performance boost that avoids processor 120 delays while waiting for data. These and other modules can be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Figure 2:
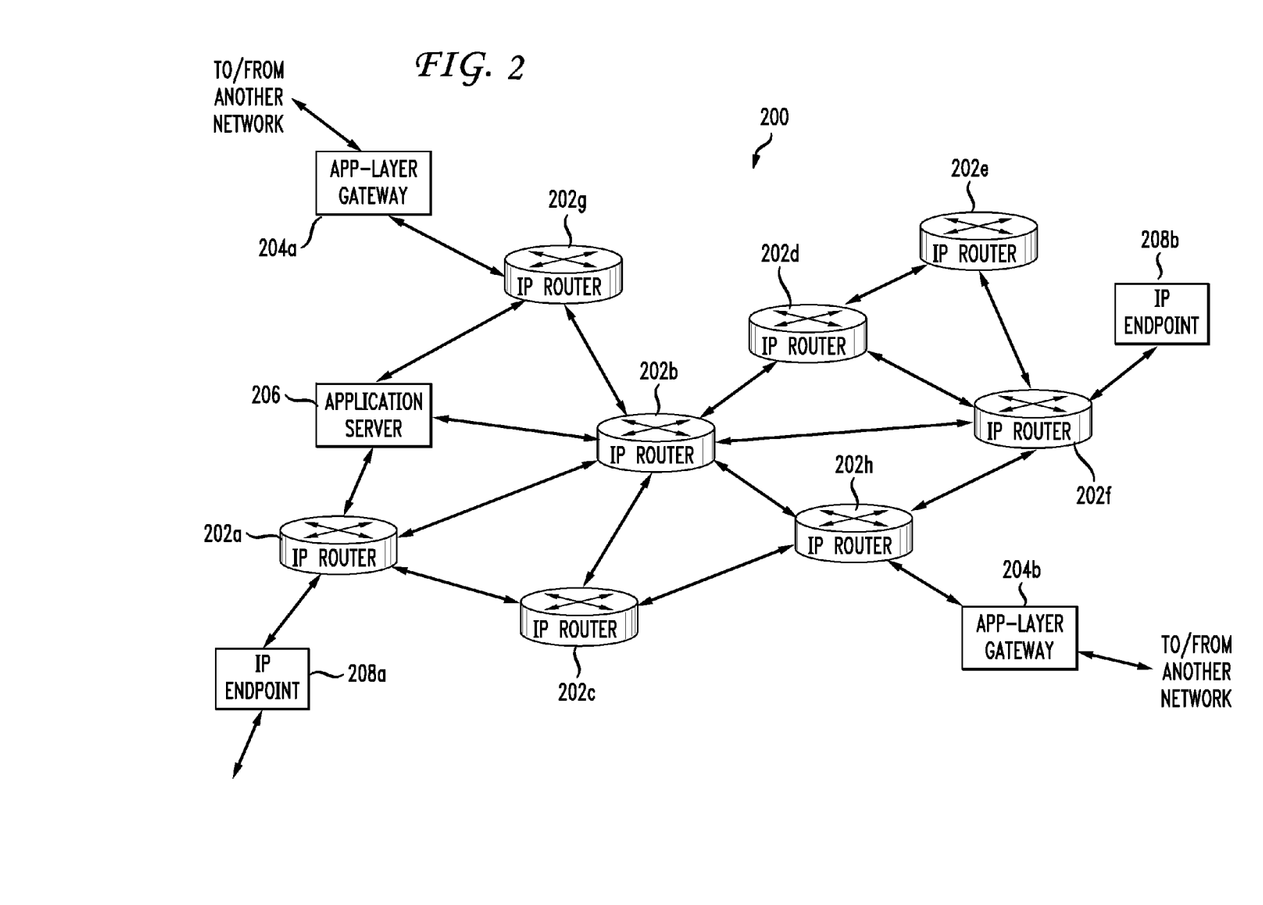
FIG. 2 illustrates an example network embodiment.

Having discussed the exemplary computing embodiment, the disclosure now turns to the example telecommunications network embodiment 200 shown in FIG. 2, within which the principles disclosed herein can operate. As shown in FIG. 2, telecommunications network 200 includes application-layer gateways 204a, 204b, an application server 206, Internet Protocol (IP) endpoints 208a, 208b, and various interconnected IP routers 202a-202h. This particular configuration of an IP-based network is illustrative. The telecommunications network is not limited to an IP-based network and is not limited to this particular configuration of application-layer gateways 204a, 204b, IP routers 202a-202h, etc.

Each IP router 202a-202h is a device that receives IP packets via one or more incoming network links and forwards the received packets along one or more outgoing network links. Typically IP routers 202a-202h maintain dynamic routing tables that enable the routers to alter the paths by which traffic is transmitted through the network 200. IP routers 202a-202h can reroute network traffic along different paths through the network 200 over time in response to various conditions such as link failures, congested routes, toll charges, and so forth. A data source such as an IP endpoint 208a, 208b or a network transmission mechanism such as an IP router 202a-202h can mark certain packets according to their contents. For example, audio traffic is marked as audio packets, video traffic is marked as video packets, and data traffic is marked as data packets.

Application-layer gateways 204a, 240b are data-processing systems that are capable of providing one or more application-layer functions such as Voice over IP (VoIP), FTP, streaming video, Internet Protocol Television (IPTV), remote desktop services, and so forth. Moreover, application-layer gateways 204a, 240b are also capable of participating in the performing one or more of the steps described herein.

Application server 206 is a data-processing system that provides one or more services to support a particular application such as VoIP or IPTV, and is also capable of participating in the performing of one or more of the tasks described herein. In accordance with one illustrative embodiment, application server 206 provides VoIP services such as call setup between two or more Internet Protocol endpoints 208a, 208b, call modification, call termination, etc. The application server 206 can provide services for other applications as well, including videoconferencing, IPTV, instead of or in addition to VoIP.

Each IP endpoint 208a, 208b is a device such as an IP telephone, an IP headset, an IP handset, an IP softphone, or an IP conference phone that communicates with other devices over the network 200 in accordance with the Internet Protocol (IP). Moreover, IP endpoints 208a, 208b can also perform one or more of the tasks described below.

The disclosure now turns to a more detailed discussion of predicting, estimating, or benchmarking video transmission quality in a network. Video deployment over networks is increasingly common and an increasingly important form of communication used by both businesses in enterprise settings, as well as personal applications. However, prior to deploying video as a preferred medium, users need to assess networks so that they will know the quality of video the network can support. This is especially important in video transmissions due to resource intensive nature of the transmissions and the fact that networks do not currently guarantee quality of service. Further, video is unique in that pure statistics do not provide meaningful feedback for what level of video quality to expect for a given network in a worst-case scenario and a best-case scenario. The numerous competing video encoders and decoders are technologically very different and each reacts very differently to different network conditions. For example, one video codec can perform well in a low-bandwidth network with consistently low levels of dropped packets, where that same video codec can perform very poorly in a high-bandwidth network that drops a lot of packets. Similarly, the same set of network conditions can produce very different results for one codec compared to another. For example, under similar network conditions, codec $C_1$ can produce pixilated video and lower quality audio that remains smooth and understandable, where codec $C_2$ can produce a frozen video output and choppy audio that is difficult to understand.

Therefore, disclosed herein is a system and method for determining the quality of a data transmission such as real-time video transmissions. While a system in accordance with the present disclosure identifies bandwidth availability, this characteristic is not sufficient to describe video quality. The following are some example factors why video quality is different to determine: the location of an error in the bitstream, the content of the video, the amount of motion in the sequence, the error concealment techniques implemented in the codec, and the codec bit rate. Furthermore, application layer approaches to assure end-to-end quality in time of network degradation are also analyzed, examples include fast updates, bitrate manipulation and proprietary codecs. However, from this exemplary list in conjunction with the present disclosure, a person of skill in the art would be able to identify other factors that can be identified and analyzed.

Figure 3:
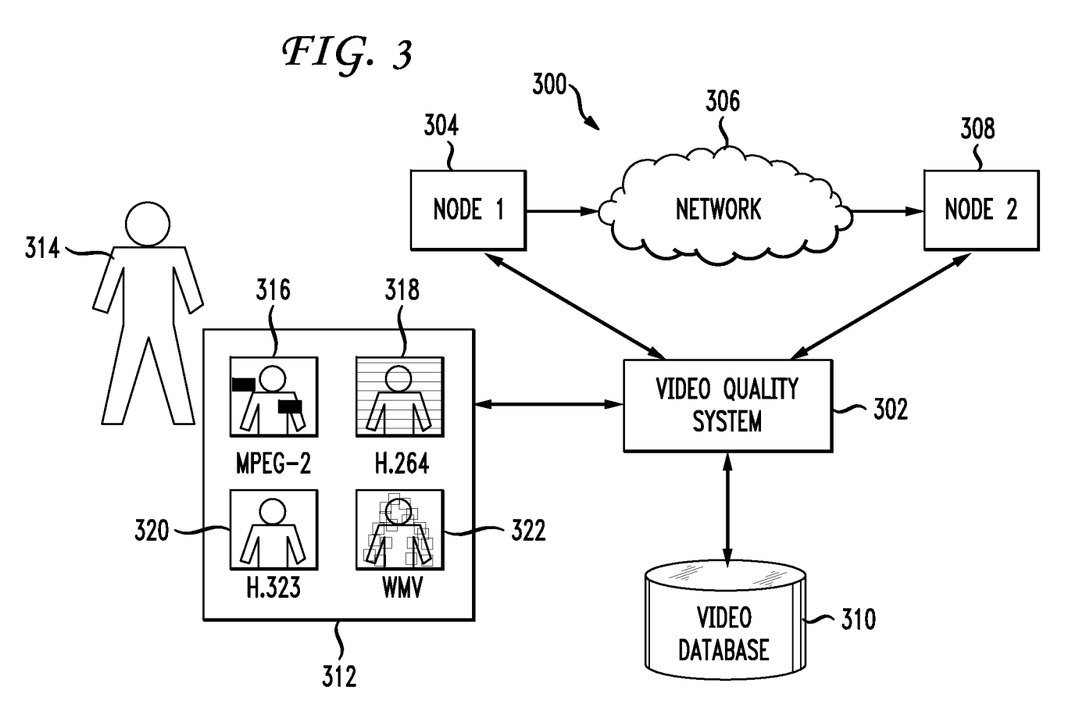
FIG. 3 illustrates an example configuration for predicting video quality through a network.

FIG. 3 illustrates one example configuration 300 for predicting video quality through a network 306. A video quality system 302 measures and determines the quality and/or characteristics of data transmission through the network 306. The video quality system 302 can identify existing endpoints and/or insert new endpoints 304, 308, such as hardware and/or software agents like 208 of FIG. 2, into the network 306 from which a measurement is desired. In one embodiment, the video quality system 302 introduces or causes to be introduced traffic at one end point 304 and measures how the traffic is received at the other end point 308 via the network 306. In another embodiment, the video quality system 302 measures the traffic in both directions through the network 306. These endpoints 304, 308 can send and receive IP or other network traffic as well as take measurements from within the network 306. The video quality system 302 analyzes how the node 308 receives the data through the network 306 to discover transmission characteristics of the network 306, such as average, worst-case, and best case statistics for bandwidth, latency, dropped packets, jitter (or the order of delivery of packets), number of hops, Quality of Service (QoS) level, and so forth. The data can be synthetic traffic that mimics the characteristics of the video applications deployed in the system. Packet level measurements pertaining to the injected traffic as well as traffic measurements from the network routing components are collected for a significant period of time. Typically, these measurements take place over multiple hours or days, however, situations do arise where the measurements can be taken at much shorter intervals, i.e., a number of minutes. The results from these measurements are then synchronized and visualized. The system creates a report, based on the measurements, summarizing the end-to-end quality that is produced within the network.

In one aspect, the report includes representative video clips from a database. Representative video clips can be more illustrative, instructive, and helpful than raw statistics. For example, a potential client evaluating a video conferencing system would probably be uninterested in the average latency and worst-case bandwidth of his or her network, but would instead be much more interested in seeing how the video conferencing system would perform on his or her network under best-case, average use, and worst-case scenarios. Disclosed herein are two approaches to display representative output of how, in this example, the video conferencing system would perform based on all or part of the measured network characteristics.

The first approach uses a database 310 of representative video clips generated under a wide range of network characteristics covering an expected range of network conditions. In this approach, the video quality system 302 identifies a network profile based on the sampled network characteristics. The system 302 then retrieves one or more representative video segments from a database 310 indexed by individual network characteristics, by network profile, by codec, and/or other factors. The video segments in the database 310 can be created by recording, in advance, actual video transmissions with multiple different video technologies through specific, known network conditions, such as through a carefully controlled test network.

The database 310 can contain video segments of different content or of a uniform piece of media. One benefit to a uniform piece of media is that different network conditions can be directly compared side by side to more carefully and precisely evaluate the differences between different conditions or codecs, for example. In one aspect, multiple different sets of uniform media can exist in the database for different purposes. For example, the database 310 can include, for each network profile, a first video clip of a two-way video conference, a second video clip streamed from a web cam, a third video clip of a security camera, a fourth video clip of a corporate press release, and so forth. Each of these scenarios includes a different type of video content to which various network conditions and codecs can react differently. The two-way video conference with relatively little motion may degrade almost imperceptibly under adverse network conditions, whereas quality of video streamed from the web cam may suffer significantly under similar conditions.

The video quality system 302 can then play back the selected one or more representative video segments on a display 312 to a user 314 to illustrate representatively how video transmissions would appear under the measured network conditions. In one aspect, the system 302 outputs multiple video segments 316, 318, 320, 322 simultaneously for easy comparison. In the illustrated example, the display 312 includes a first representative video 316 illustrating how an MPEG-2 codec would perform under network conditions measured in the network 306. The display 312 also includes a second representative video 318 for H.264 video, a third representative video 320 for H.323 video, and a fourth representative video 322 for WMV video. FIG. 2 illustrates exemplary different video codec behaviors in the display 312. As another example, the system 302 facilitates a comparison of how a single codec performs in a given network by outputting a worst-case scenario video segment for video codec $C_1$ on the left side of a display and an average-use-case scenario video segment for video codec $C_1$ on the right side of the display. The system can facilitate a comparison of how two different codecs perform in two different network condition scenarios by outputting a worst-case scenario video segment for video codec $C_1$ on the upper left side of a display, an average-use-case scenario video segment for video codec $C_1$ on the upper right side of the display, a worst-case scenario video segment for video codec $C_2$ on the lower left side of a display, and an average-use-case scenario video segment for video codec $C_2$ on the lower right side of the display. When the system outputs such video clips in close proximity, the relative flaws or virtues of a particular network condition or video codec can become clearer.

The second approach to display representative output is to use an algorithm to generate a representative video clip for particular video settings given the measured network characteristics. For example, given a standard testing video clip, the video quality system 302 can apply an algorithm to introduce artifacts consistent with the measured network characteristics for a given video codec. For example, if the testing video clip is encoded using MPEG-2 and transmitted over a network having inconsistent latency and significant jitter, the algorithm can introduce corresponding levels of blockiness, signal degradation, quantization noise, and/or other artifacts into the testing video clip to represent how the testing video clip would appear under those conditions.

In one aspect, the second approach operates in conjunction with the first approach of a database of representative video clips. For example, the database of representative video clips can include a set of video clips that incompletely covers the space of possible network characteristics. The algorithm can identify a closest video clip for the measured network characteristics. Then the algorithm can modify the closest video clip based on the differences between the conditions under which the closest video clip was recorded and the measured network conditions.

In one variation, the system further suggests ways to improve the video quality. For example, the system can detect that frequent packet collisions are occurring and suggest to upgrade the intermediate network infrastructure from 100 megabit hubs to gigabit routers. Alternatively, the system can detect that the indicated video codec operates particularly poorly under the measured network conditions, while an alternative video codec operates considerably better. The system can then suggest to a user switching to the alternative video codec and show a video clip based on the alternative codec.

In one embodiment, the system measures video quality by using realistic synthetic video traffic injection and estimating video quality. One method of obtaining realistic synthetic video traffic is to collect traffic samples of the target application by running actual video equipment in a lab setting and record real-time transport protocol (RTP) packets of the actual video streams. Then during the assessment period, these prerecorded streams are injected into the network to ensure realistic traffic injection. Some exemplary factors used in the network to ensure the video is high quality are to require the minimization or absence of artifacts in video or audio streams and synchronization of the video and audio streams.

In one embodiment, the system collects and processes large sets of network measurements in real time or near real time. One way to facilitate the near real time processing consistent with this disclosure is to estimate video quality using lightweight packet level measurements in a computationally feasible manner. One process for lightweight packet level management is for the system to make the estimate without storing or processing the packet payloads.

An embodiment conforming to the present disclosure can use low bitrate and small picture size configurations, such as common intermediate format (CIF), quarter CIF (QCIF), 4 times CIF (4CIF), source input format (SIF), and others. Such small picture size configurations can be suitable for a desktop or laptop, for example. One common type of video transmitted via a network is video conferencing, which typically has low motion levels. An example of a video with these characteristics is the video quality produced by a video phone, with that video run on a personal computer. One reason to use low bitrate, small picture size, and low motion level video is that these can lead to easier error concealment and may level the impact of network impairment on video quality. This leads to a situation where a network fault can impact quality more evenly regardless of which part of the bitstream is impacted. Further, the quality of videos with these characteristics can be better explained by RTP packet loss compared to high motion level content. One benefit of using RTP loss (or network packet loss) measurements is not necessarily that it explains quality better than bandwidth measurements, but that it achieves the same level of accuracy with less effort because a common first symptom of exceeding the allocated available bandwidth is packet loss.

The above disclosure forms the basis of a video testing system, where the testing system relies on test video clips that are sent through a controlled test network environment simulating different network conditions. A further aspect of the present disclosure is a simulation network. For example, the testing system in FIG. 2, with endpoints 208, can be configured to simulate different levels of network degradation thereby allowing for the creation of a database containing differing video qualities representing transmissions through the network under simulated and different circumstances. This simulation network can drop different percentages of packets to closely estimate the end video quality. For instance, if a network can achieve a best case scenario of 1% RTP packet loss, and average scenario of 5% RTP packet loss, and a worst case scenario of 10% RTP packet loss, the system transmits these characteristics to the database. The system can then generate a simulation within the network to allow the user to see what each video, the best, average, and worst case video, looked like. The test network can also simulate out of order packet arrival, unexpected periods of high latency, the removal or malfunctioning of a particular piece of network hardware, and further network problems that are known to those of skill in the art. Thereafter, a database is formed of conceivable network conditions and test video clips representing receiver-end video transmission quality under a wide variety of specific, controlled network conditions.

Figure 4:
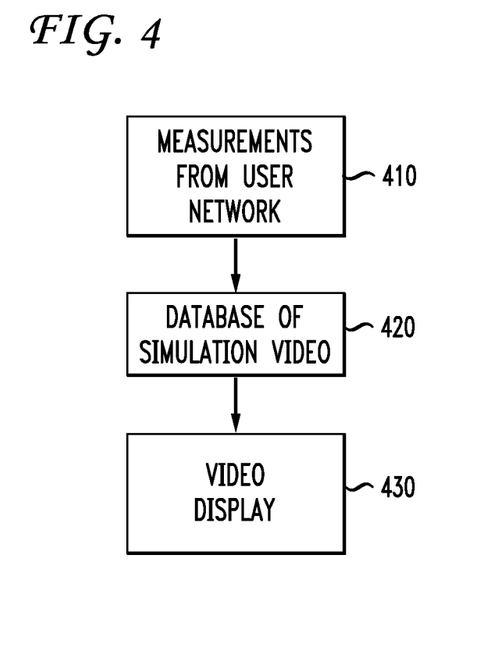
FIG. 4 illustrates the network communicating with a database.

The test networks can be set up within a user network infrastructure where various system hardware and characteristics are identified and measured, including but not limited to, available bandwidth, provisioning capabilities, routers, and other known network conditions, by using synthetic video traffic. Further, characteristics are recorded for each of the best, the average, and the worst case scenario identified by the test network. These characteristics include but are not limited to average packet loss, average latency, latency spikes, and other relevant characteristics known to those of skill in the art. FIG. 4 illustrates using these characteristics. The measured network characteristics as well as the best case, average case, and worst case scenario characteristics (410) are transmitted to the database (420) where videos of comparable quality are identified in the database (420), which contains videos produced in the simulation network. The chosen videos are then transferred from the database (420) to the video display (430) and viewed by the user. These retrieved videos shown to the user are an estimate of the video quality that the user's network is capable of supporting.

The database of videos can include many different types of video that are different bitrates, resolutions or other known parameters that are important to users. Further, the database can consider how the video application responds to different combinations of network conditions. Similarly, the database can consider how the video codecs respond to different combinations of network conditions, including in combination with the video response.

Another embodiment consistent with the present disclosure can perform the same tests for characteristics as disclosed above, and can repeat those tests using different video providers or different codecs. A list of exemplary codecs includes but is not limited to H.264, Moving Pictures Expert Group (MPEG), Windows Media Video (WMV), Audio Video Interleave (AVI), Apple QuickTime Movie format (MOV), DIVX video codec by DivX, INC., Real Media (RM), Third Generation Partnership Project file format (3GP), and Flash Video (FLV). Video can be interlaced or non-interlaced. Further, multiple types of video conferencing equipment can be used from multiple vendors. Then the system can simulate the different vendor equipment or different codecs used with the system, so that a user can determine the best vendor system and the best codec with that vendor system to use on their network. This also includes an expanded database that contains video consistent with the specific vendor equipment and each possible codec that vendors use. Different versions of a same piece of decoding equipment and/or software can have different performance characteristics even though they implement (albeit in different ways) the same codec. Thus, the database can store versioning information for various hardware, software, and combinations thereof.

A further embodiment within the scope of this disclosure is within the residential or private networks. If two users who wish to communicate via cellular networks or the internet using video conferencing capabilities that are contained with a cellular telephone or personal computer, endpoints can be set up by each user, such as via a JavaScript-based web browser application, thereby allowing for the testing of the network capabilities of a home or remote office. The user device can then upload results of the test to a remote server that can return video results based on the results. The users are then able to check the characteristics of the network and the system can produce a sample video to approximate the best-, average-, and worst-case scenarios available to the user of a video conferencing application.

Figure 5:
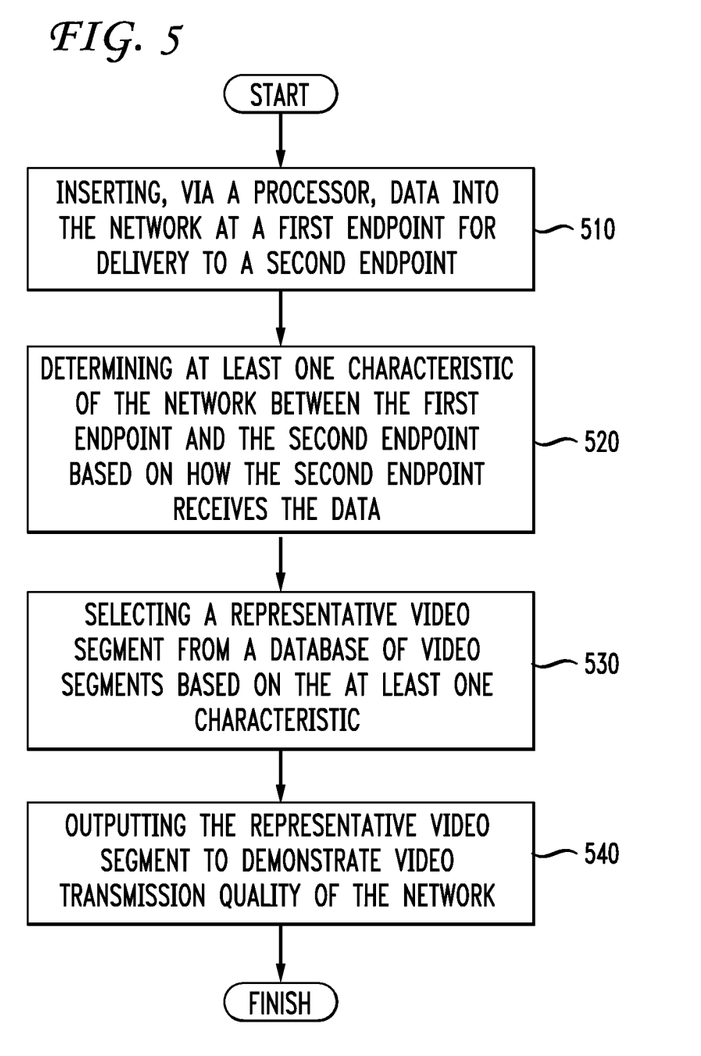
FIG. 5 illustrates a sample method embodiment.

FIG. 5 illustrates an example method embodiment of the present disclosure. The method is discussed in terms of a system 100, as shown in FIG. 1, configured to approximate video transmission quality capability of a network. The system 100 inserts, via a processor, data into the network at a first endpoint for delivery to a second endpoint (510). The system 100 can insert data into the network under an artificially created scenario that approximates actual, estimated, and/or expected network conditions. The artificially created scenario can be, for example, a best-case scenario, an average-case scenario, and a worst-case scenario. In one implementation, the system further determines at least one respective characteristic of the network for the artificially created scenarios, selects respective representative video segments from the database of video segments based on the at least one respective characteristic for each of the artificially created scenarios, and outputs a comparison of the respective representative video segments.

After inserting data into the network, the system 100 determines characteristics of the network between the first endpoint and the second endpoint, based on how the second endpoint receives the data (520). The system can also identify, based on how the second endpoint receives the data, at least one piece of key data and/or other characteristic of the network between the first endpoint and the second endpoint associated with a data transmission problem. The system can use the key data and network characteristics for troubleshooting purposes. Network characteristics can include, for example, packet loss, latency, jitter, bandwidth, congestion, duplicate packets, retransmitted packets, location of an error in the bitstream, content of the video, amount of motion in the sequence, error concealment techniques implemented in a codec, a codec bit rate, fast updates, bit rate manipulation, and/or proprietary codecs.

The system 100 selects and/or generates a representative video segment from a database of video segments based on the characteristics of the network (530). In one aspect, the system 100 selects the representative video segment further based on a particular identified hardware component. Finally, after selecting the representative video segment, the system 100 outputs the representative video segment to demonstrate the video transmission quality capabilities of the network (540).

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

I claim:

1. A method comprising:
inserting, via a processor, data into a first network at a first endpoint for delivery to a second endpoint in the first network;
determining a characteristic of the first network between the first endpoint and the second endpoint by measuring, at a first time, a performance characteristic of the data as received by the second endpoint, to yield a measured characteristic of the first network;
selecting a representative video segment from an existing database of video segments, the existing database created from a second network at a second time prior to the first time, based on the measured characteristic of the first network; and
outputting the representative video segment to demonstrate video transmission quality of the first network.

2. The method of claim 1, wherein the data is inserted into the first network under an artificially created scenario that approximates actual network conditions.

3. The method of claim 2, wherein the artificially created scenario comprises one of a best-case scenario, an average-case scenario, and a worst-case scenario.

4. The method of claim 1, wherein determining the characteristic further comprises identifying a piece of data associated with a data transmission problem based on the performance characteristic.

5. The method of claim 4, wherein selecting the representative video segment is further based on the piece of data.

6. The method of claim 1, wherein the measured characteristic of the first network comprises one of packet loss, latency, jitter, bandwidth, congestion, duplicate packets, retransmitted packets, location of an error in the bitstream, content of the video, amount of motion in the sequence, error concealment techniques implemented in a codec, a codec bit rate, fast updates, bitrate manipulation and proprietary codecs.

7. The method of claim 1, wherein the data is inserted into the first network multiple times under a plurality of artificially created scenarios that approximate actual network conditions, the method further comprising:
determining a respective characteristic of the first network for each of the plurality of the artificially created scenarios;
selecting respective representative video segments from the existing database of video segments, based on the respective characteristic, for each of the plurality of the artificially created scenarios; and
outputting a comparison of the respective representative video segments.

8. A system comprising:
a processor; and
a computer-readable device having stored therein instructions which, when executed by the processor, cause the processor to perform operations comprising:
inserting data into a first network at a first endpoint for delivery to a second endpoint in the first network;
determining a characteristic of the first network between the first endpoint and the second endpoint by measuring, at a first time, a performance characteristic of the data as received by the second endpoint, to yield a measured characteristic of the first network;
selecting a representative video segment from an existing database of video segments, the existing database created from a second network at a second time prior to the first time, based on the measured characteristic of the first network; and
outputting the representative video segment to demonstrate video transmission quality of the first network.

9. The system of claim 8, wherein the data is inserted into the first network under an artificially created scenario that approximates actual network conditions.

10. The system of claim 9, wherein the artificially created scenario comprises one of a best-case scenario, an average-case scenario, and a worst-case scenario.

11. The system of claim 8, wherein determining the characteristic further comprises identifying a piece of data associated with a data transmission problem based on the performance characteristic.

12. The system of claim 11, wherein selecting the representative video segment is further based on the piece of data.

13. The system of claim 8, wherein the measured characteristic of the first network comprises one of packet loss, latency, jitter, bandwidth, congestion, duplicate packets, retransmitted packets, location of an error in the bitstream, content of the video, amount of motion in the sequence, error concealment techniques implemented in a codec, a codec bit rate, fast updates, bitrate manipulation and proprietary codecs.

14. The system of claim 8, wherein the data is inserted into the first network multiple times under a plurality of artificially created scenarios that approximate actual network conditions, and wherein the computer-readable storage device stores additional instructions which, when executed by the processor, cause the processor to perform further operations comprising:
determining a respective characteristic of the first network for each of the plurality of the artificially created scenarios;
selecting respective representative video segments from the existing database of video segments, based on the respective characteristic, for each of the plurality of the artificially created scenarios; and
outputting a comparison of the respective representative video segments.

15. A computer-readable storage device storing instructions which, when executed by a processor, cause the processor to perform operations comprising:
Inserting data into a first network at a first endpoint for delivery to a second endpoint in the first network;
determining a characteristic of the first network between the first endpoint and the second endpoint by measuring, at a first time, a performance characteristic of the data as received by the second endpoint, to yield a measured characteristic of the first network;
selecting a representative video segment from an existing database of video segments, the existing database created from a second network at a second time prior to the first time, based on the measured characteristic of the first network; and
outputting the representative video segment to demonstrate video transmission quality of the first network.

16. The computer-readable storage device of claim 15, wherein the data is inserted into the first network under an artificially created scenario that approximates actual network conditions.

17. The computer-readable storage device of claim 16, wherein the artificially created scenario comprises one of a best-case scenario, an average-case scenario, and a worst-case scenario.

18. The computer-readable storage device of claim 15, wherein determining the characteristic further comprises identifying a piece of data associated with a data transmission problem based on the performance characteristic.

19. The computer-readable storage device of claim 18, wherein selecting the representative video segment is further based on the piece of data.

20. The computer-readable storage device of claim 15, wherein the data is inserted into the first network multiple times under a plurality of artificially created scenarios that approximate actual network conditions, and wherein the instructions, when executed by the processor, cause the processor to perform further operations comprising:
- determining a respective characteristic of the first network for each of the plurality of the artificially created scenarios;
- selecting respective representative video segments from the existing database of video segments, based on the respective characteristic, for each of the plurality of the artificially created scenarios; and
- outputting a comparison of the respective representative video segments.

* * * * *